US012272293B2

(12) United States Patent
Choi et al.

(10) Patent No.: US 12,272,293 B2
(45) Date of Patent: Apr. 8, 2025

(54) DISPLAY APPARATUS AND DRIVING METHOD THEREOF

(71) Applicant: LG Display Co., Ltd., Seoul (KR)

(72) Inventors: Young Il Choi, Paju-si (KR); Dae Hyeon Park, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 18/514,614

(22) Filed: Nov. 20, 2023

(65) Prior Publication Data

US 2024/0221599 A1 Jul. 4, 2024

(30) Foreign Application Priority Data

Dec. 29, 2022 (KR) ........................ 10-2022-0189682

(51) Int. Cl.

| | |
|---|---|
| ***G11C 29/02*** | (2006.01) |
| ***G09G 3/20*** | (2006.01) |
| ***G09G 3/3233*** | (2016.01) |
| ***G09G 3/3258*** | (2016.01) |

(52) U.S. Cl.

CPC ......... *G09G 3/2096* (2013.01); *G09G 3/3233* (2013.01); *G09G 2300/0842* (2013.01); *G09G 2320/0233* (2013.01); *G09G 2320/0295* (2013.01); *G09G 2320/045* (2013.01); *G09G 2320/0693* (2013.01)

(58) Field of Classification Search

CPC ............... G09G 3/2096; G09G 3/3233; G09G 2300/0842; G09G 2320/0233–0295; G09G 2320/045; G09G 2320/0693; G11C 29/023

See application file for complete search history.

(56) References Cited

U.S. PATENT DOCUMENTS

2018/0174522 A1* 6/2018 Lee ...................... G09G 3/3258
2018/0308532 A1* 10/2018 Roh ..................... G11C 29/023
2023/0134326 A1* 5/2023 Lee ...................... G09G 3/3233
345/690

* cited by examiner

*Primary Examiner* — Lin Li

(74) *Attorney, Agent, or Firm* — Birch, Stewart, Kolasch & Birch, LLP

(57) ABSTRACT

A display apparatus can include a display panel configured to display an image, a driver configured to drive the display panel, a controller configured to control driver, and a memory controlled by the controller. The controller performs a calibration operation during an idle period of the memory.

15 Claims, 14 Drawing Sheets

DISPLAY APPARATUS AND DRIVING METHOD THEREOF

CROSS-REFERENCE TO RELATED APPLICATIONS

This application claims priority to Korean Patent Application No. 10-2022-0189682 filed in the Republic of Korea on Dec. 29, 2022, the entire contents of which are hereby expressly incorporated by reference into the present application.

BACKGROUND

Field

The present disclosure relates to a display apparatus and a driving method thereof.

Discussion of the Related Art

As information technology advances, the market for display apparatuses which are connection mediums for connecting a user with information is growing. Therefore, the use of display apparatuses such as light emitting display apparatuses, quantum dot display (QDD) apparatuses, and liquid crystal display (LCD) apparatuses is increasing.

The display apparatuses described above include a display panel having a plurality of subpixels, a driver outputting a driving signal for driving the display panel, and a power supply supplying power to the display panel and/or the driver.

In such display apparatuses, when the driving signal (for example, a scan signal and a data signal) is supplied to each of the subpixels provided in the display panel, a selected subpixel can transmit light or can self-emit light, and thus, an image can be displayed.

SUMMARY OF THE DISCLOSURE

The present disclosure can perform a calibration operation during an idle period of a memory or a sensing period of a display apparatus to increase driving stability or reliability.

Further, the present disclosure can minimize an error occurrence rate in performing the calibration operation.

Further, the present disclosure can solve or address a limitation (luminance non-uniformity) where compensation data can be damaged (lost) in performing an update operation for writing new compensation data, or inaccurate compensation can be performed based thereon.

To achieve these objects and other advantages and in accordance with the purpose of the disclosure, as embodied and broadly described herein, a display apparatus according to an embodiment of the present disclosure includes a display panel configured to display an image, a driver configured to drive the display panel, a controller configured to control the driver, and a memory controlled by the controller, wherein the controller performs a calibration operation during an idle period of the memory.

The idle period of the memory can be included in a sensing period of the display panel.

The controller can change a parameter value for forming a communication environment with the memory, based on the calibration operation.

The controller can monitor a memory power applied to the memory and senses occurrence or no occurrence of noise in the memory power.

When noise occurs in the memory power, the controller can change a time at which the calibration operation is performed.

The time, at which the calibration operation is performed, can be shifted to a former use time or a latter use time of the memory in the sensing period of the display panel.

When the time at which the calibration operation is performed is shifted, the controller can temporarily skip an update operation of writing new data in the memory.

The controller can perform the update operation of writing the new data in the memory in a sensing period of at least next frame.

In another aspect of the present disclosure, a driving method of a display apparatus, including a display panel configured to display an image, a driver configured to drive the display panel, a controller configured to control the driver, and a memory controlled by the controller, includes driving the display panel, and performing a calibration operation of changing a parameter value for forming a communication environment with the memory during a sensing period for compensating for the display panel.

The performing of the calibration operation can include, when noise occurs in a memory power applied to the memory, changing a time at which the calibration operation is performed.

The time, at which the calibration operation is performed, can be shifted to a former use time or a latter use time of the memory in the sensing period of the display panel.

The driving method can further include, when the time at which the calibration operation is performed is shifted, temporarily skipping an update operation of writing new data in the memory.

The update operation of writing the new data in the memory can be performed in a sensing period of at least next frame.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE EMBODIMENTS

Hereinafter, the present disclosure will be described more fully with reference to the accompanying drawings, in which exemplary embodiments of the disclosure are shown. The disclosure can, however, be embodied in many different forms and should not be construed as being limited to the embodiments set forth herein; rather, these embodiments are provided so that this disclosure will be thorough and complete, and will fully convey the concept of the disclosure to those skilled in the art.

A display apparatus according to the present disclosure can be applied to televisions (TVs), video players, personal computers (PCs), home theaters, electronic devices for vehicles, and smartphones, but is not limited thereto. The display apparatus according to the present disclosure can be implemented as a light emitting display apparatus, a quantum dot display (QDD) apparatus, or a liquid crystal display (LCD) apparatus. Hereinafter, for convenience of description, a light emitting display apparatus self-emitting light on the basis of an inorganic light emitting diode or an organic light emitting diode will be described for example. A light emitting display apparatus can be implemented based on an inorganic light emitting diode, or can be implemented based on an organic light emitting diode. Hereinafter, for convenience of description, an example will be described where a light emitting display apparatus is implemented based on an organic light emitting diode. All the components of each display apparatus according to all embodiments of the present disclosure are operatively coupled and configured.

Figure 1:
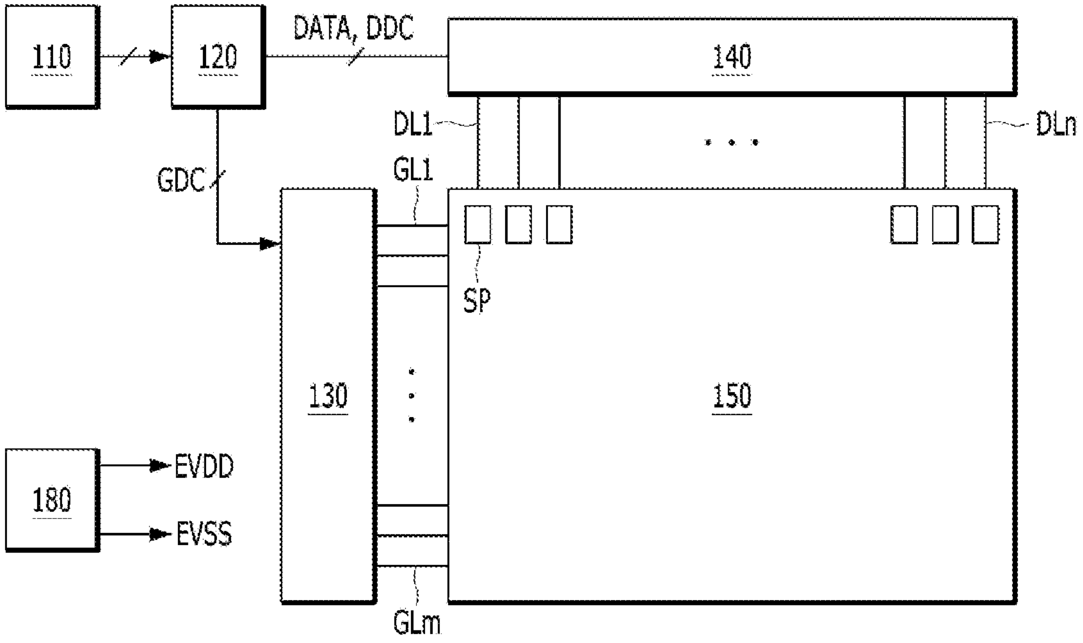
FIG. 1 is a block diagram schematically illustrating a light emitting display apparatus according to an example of the present disclosure.
Figure 2:
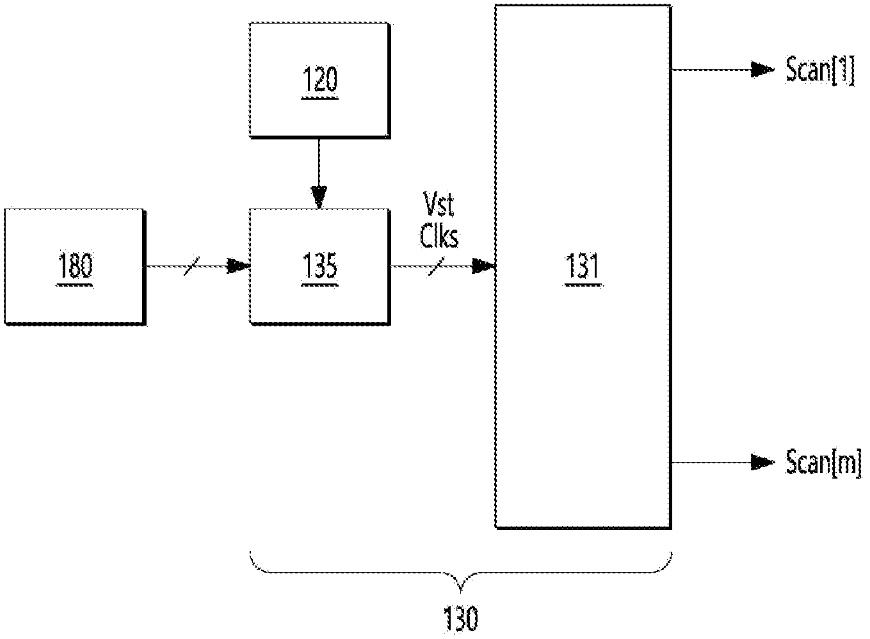
FIGS. 2 and 3 are diagrams for describing a configuration of a scan driver of a gate in panel (GIP) type according to an example of the present disclosure.
Figure 3:
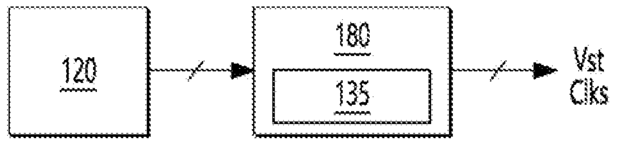
Figure 4:
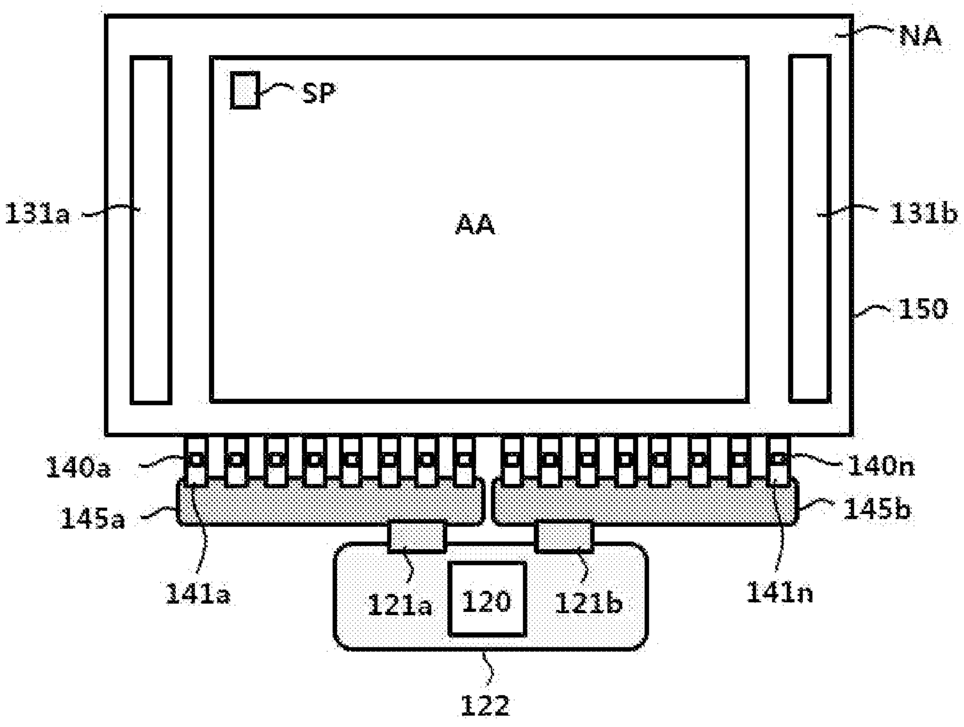
FIG. 4 is a module configuration diagram of the light emitting display apparatus.

FIG. 1 is a block diagram schematically illustrating a light emitting display apparatus according to an example of the present disclosure, FIGS. 2 and 3 are diagrams for describing a configuration of a scan driver of a gate in panel (GIP) type according to an example of the present disclosure, and FIG. 4 is a module configuration diagram of the light emitting display apparatus.

As illustrated in FIG. 1, the light emitting display apparatus according to an embodiment of the present disclosure can include a video supply unit 110, a timing controller 120, a scan driver 130, a data driver 140, a display panel 150, and a power supply 180.

The video supply unit 110 (a set or a host system) can output a video data signal supplied from the outside or a video data signal and various driving signals stored in an internal memory thereof. The video supply unit 110 can supply a data signal and the various driving signals to the timing controller 120.

The timing controller 120 can output a gate timing control signal GDC for controlling an operation timing of the scan driver 130, a data timing control signal DDC for controlling an operation timing of the data driver 140, and various synchronization signals. The timing controller 120 can provide the data driver 140 with the data timing control signal DDC and a data signal DATA supplied from the video supply unit 110. The timing controller 120 can be implemented as an integrated circuit (IC) type and can be mounted on a printed circuit board (PCB), but is not limited thereto.

The scan driver 130 can output a scan signal (or a scan voltage) in response to the gate timing control signal GDC supplied from the timing controller 120. The scan driver 130 can supply the scan signal to a plurality of subpixels SP, included in the display panel 150, through a plurality of gate lines GL1 to GLm, where m is a positive number such as a positive integer. The scan driver 130 can be implemented as an IC type or can be directly provided on the display panel 150 in a gate in panel (GIP) type, but is not limited thereto.

In response to the data timing control signal DDC supplied from the timing controller 120, the data driver 140 can sample and latch the data signal DATA, convert a digital data signal into an analog data voltage on the basis of a gamma reference voltage, and output the analog data voltage. The data driver 140 can respectively supply data voltages to the subpixels of the display panel 150 through a plurality of data lines DL1 to DLn where n is a positive number such as a positive integer. The data driver 140 can be implemented as an IC type or can be mounted on the display panel 150 or a PCB, but is not limited thereto.

The power supply 180 can generate a high voltage and a low voltage on the basis of an external input voltage supplied from the outside and can respectively output the high voltage and the low voltage through a high voltage line EVDD and a low voltage line EVSS. The power supply unit 180 can generate and output a voltage needed for driving of the scan driver 130, a voltage needed for driving of the data driver 140, and a voltage needed for driving of a memory, in addition to the high voltage and the low voltage.

The display panel 150 can display an image on the basis of a driving signal including the scan signal and a data voltage, the high voltage, and the low voltage. Subpixels of the display panel 150 can self-emit light. The display panel 150 can be manufactured based on a substrate, having stiffness or flexibility, such as glass, silicon, or polyimide. Further, a pixel emitting light can include red, green, and blue subpixels, or can include red, green, blue, and white subpixels. For example, one subpixel SP can be connected with a first data line DL1, a first gate line GL1, the high voltage line EVDD, and the low voltage line EVSS.

Hereinabove, each of the timing controller 120, the scan driver 130, and the data driver 140 has been described as an individual element. However, based on an implementation type of a light emitting display apparatus, one or more of the timing controller 120, the scan driver 130, and the data driver 140 can be integrated into one IC.

As illustrated in FIGS. 2 and 3, the scan driver 130 of the GIP type can include a shift register 131 and a level shifter 135. The level shifter 135 can generate scan clock signals Clks and a start signal Vst, based on signals and voltages respectively output from the timing controller 120 and the power supply 180.

The shift register 131 can operate based on the signals Clks and Vst output from the level shifter 135 and can scan signals Scan[1] to Scan[m] for turning on or off transistors included in the display panel. The shift register 131 can be provided as a thin film type on the display panel, based on the GIP type.

The level shifter 135 can be independently provided as an IC type unlike the shift register 131, or can be included in the power supply 180. However, this can be merely an embodiment, and the present disclosure is not limited thereto.

As illustrated in FIG. 4, the display panel 150 can include a display area (active area) AA which displays an image and a non-display area (non-active area) NA which does not display an image. The plurality of subpixels SP can be provided in the display area AA. A plurality of shift registers 131*a* and 131*b* which output scan signals in a GIP-type scan driver can be provided in the non-display area NA.

The display panel 150 can be configured as a module by a plurality of data drivers 140*a* to 140*n* mounted on a plurality of first circuit boards 141*a* to 141*n* and one timing controller 120 mounted on one control board 122. The plurality of data drivers 140*a* to 140*n* can be electrically connected with the one timing controller 120 by at least two second circuit boards 145*a* and 145*b* and at least two cables 121*a* and 121*b*. The plurality of first circuit boards 141*a* to 141*n* can each be selected as a flexible circuit board, and the at least two second circuit boards 145*a* and 145*b* can each be selected as a printed circuit board (PCB). However, a module configuration diagram illustrated in FIG. 4 can be merely for helping understanding, and the present disclosure is not limited thereto.

Figure 5:
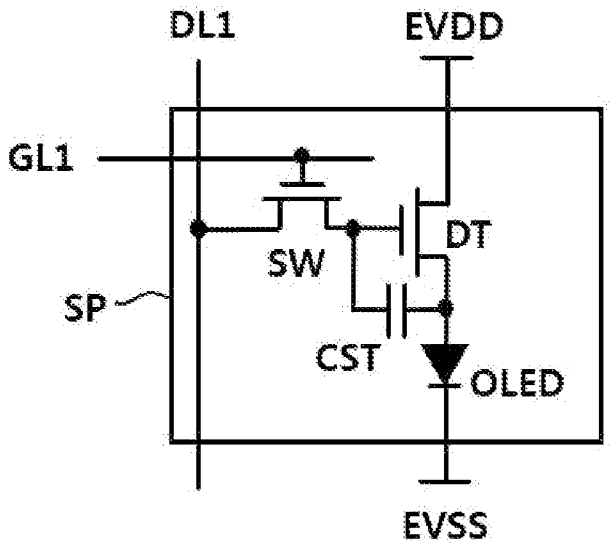
FIGS. 5 and 6 are diagrams for describing a light emitting display apparatus according to a first embodiment of the present disclosure.
Figure 6:
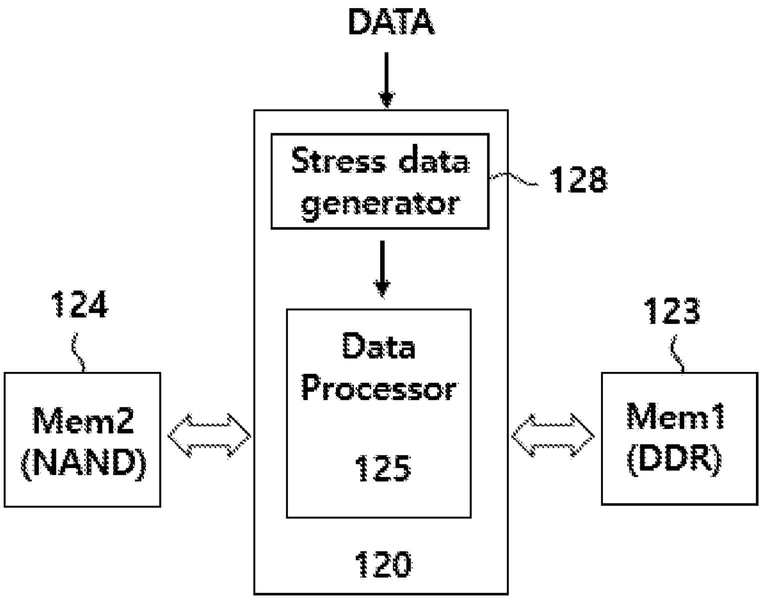

FIGS. 5 and 6 are diagrams for describing a light emitting display apparatus according to a first embodiment of the present disclosure.

As illustrated in FIG. 5, a subpixel SP according to the first embodiment can include a switching transistor SW, a capacitor CST, a driving transistor DT, and an organic light emitting diode OLED. The subpixel SP according to the first embodiment can use a sensing-less method which does not directly sense and compensates for elements included therein. The subpixel configuration of FIG. 5 can be applied to any subpixel of each display apparatus of the present disclosure.

In the sensing-less method, when a scan signal is applied through a first gate line GL1 and a data voltage is applied through a first data line DL1, the data voltage can be stored in the capacitor CST, and the driving transistor DT can generate a driving current, based on the data voltage. When the driving current is generated, the organic light emitting diode OLED can emit light with the driving current.

Furthermore, elements such as the organic light emitting diode OLED and the driving transistor DT can be changed or degraded (reduction in performance) in driving characteristic (for example, a threshold voltage) by a use (driving) time and a use environment. Due to this, the subpixel according to the first embodiment can need a compensation circuit for compensating for the driving characteristic change and degradation of the elements such as the organic light emitting diode OLED and the driving transistor DT, and this will be described below.

As illustrated in FIGS. 5 and 6, the timing controller 120 can be an element for compensating for a change in characteristic of the elements such as the organic light emitting diode OLED and the driving transistor DT included in the subpixel and can include a stress data generator 128 and a data processor 125.

The timing controller 120 can control a first memory (Mem1) 123 and a second memory (Mem2) 124 of the display apparatus. The first memory 123 can be selected as a volatile memory (for example, a double data rate (DDR) memory) which can maintain temporarily stored data in only a state where a device is powered on. The second memory 124 can be selected as a non-volatile memory (for example, NAND memory) which can maintain continuously stored data despite a state where a device is powered off.

The stress data generator 128 can generate stress data for predicting a change and a degradation in characteristic of the elements such as the organic light emitting diode OLED and the driving transistor DT, based on a data signal DATA input from the outside.

The data processor 125 can generate a compensation data signal for compensating for a change in characteristic of the elements such as the organic light emitting diode OLED and the driving transistor DT, based on the data signal DATA and the stress data. A process of generating the compensation data signal by using the data processor 125 will be described below.

To generate the compensation data signal, the data processor 125 can read initial compensation data stored in the second memory 124 and can store the initial compensation data in the first memory 123. The data processor 125 can compare current stress data, generated by the stress data generator 128, with the initial compensation data (or updated compensation data). The data processor 125 can compare the current stress data with the initial compensation data, predict a change and a degradation in characteristic of the elements such as the organic light emitting diode OLED and the driving transistor DT, and generate the compensation data signal for compensating for the predicted change and degradation.

Figure 7:
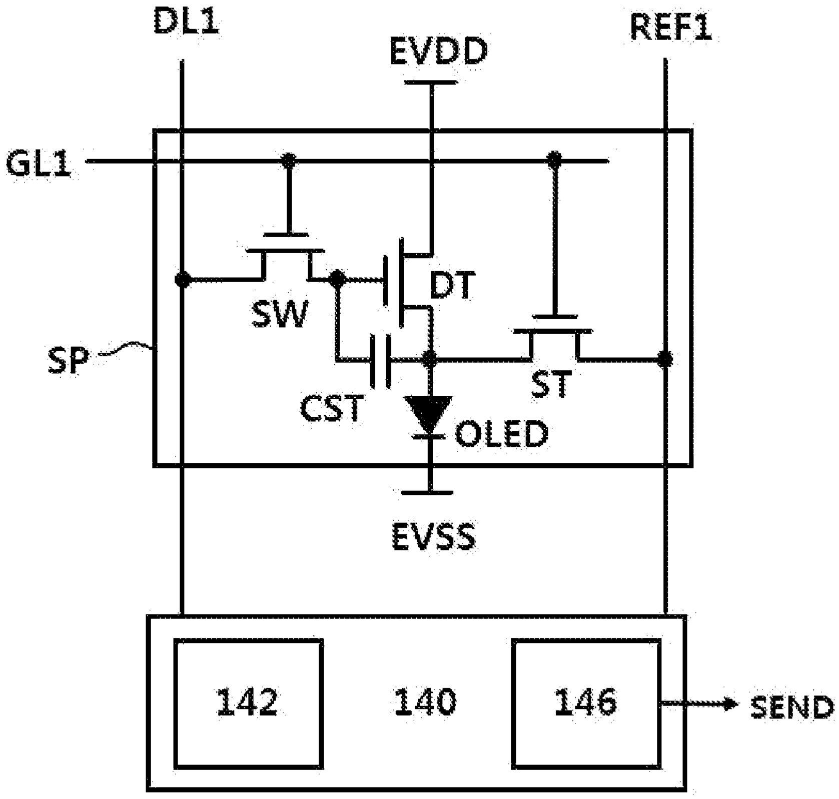
FIGS. 7 and 8 are diagrams for describing a light emitting display apparatus according to a second embodiment of the present disclosure.
Figure 8:
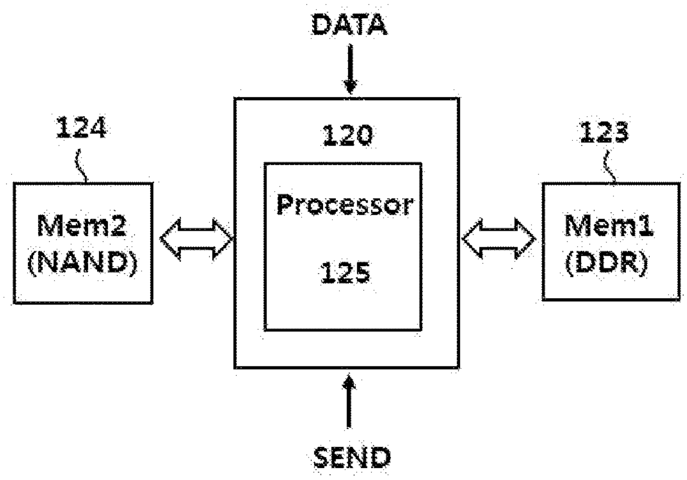

FIGS. 7 and 8 are diagrams for describing a light emitting display apparatus according to a second embodiment of the present disclosure.

As illustrated in FIG. 7, a subpixel SP according to the second embodiment can include a switching transistor SW, a capacitor CST, a driving transistor DT, a sensing transistor ST, and an organic light emitting diode OLED. The subpixel SP according to the second embodiment can use a sensing method which senses and compensates for elements included therein. The subpixel configuration of FIG. 7 can be applied to any subpixel of each display apparatus of the present disclosure.

The sensing method can be performed to be equal to the sensing-less method and can perform an operation of sensing an element such as the sensing transistor ST, which is turned on during a separate sensing period. To this end, a data driver 140 can include a voltage output unit 142 which outputs a data voltage through a first data line DL1 and a sensing circuit unit 146 which obtains a sensing value through a first reference line REF1. The sensing circuit unit 146 can convert an analog sensing value into a digital sensing value SEND and can transfer the digital sensing value SEND to a timing controller.

The subpixel according to the second embodiment can also need a compensation circuit for compensating for a change and a degradation in driving characteristic of the elements such as the organic light emitting diode OLED and the driving transistor DT, and this will be described below.

As illustrated in FIGS. 7 and 8, a timing controller 120 can be an element for compensating for a change in characteristic of the elements such as the organic light emitting diode OLED and the driving transistor DT included in the subpixel and can include the sensing circuit unit 146 and a data processor 125.

The timing controller 120 can control a first memory (Mem1) 123 and a second memory (Mem2) 124. The first memory 123 can be selected as a DDR memory, and the second memory 124 can be selected as NAND memory.

The sensing circuit unit 146 can provide a sensing value SEND for predicting a change and a degradation in driving characteristic of the elements such as the organic light emitting diode OLED and the driving transistor DT, based on a direct sensing method. The data processor 125 can generate a compensation data signal for compensating for a change in characteristic of the elements such as the organic light emitting diode OLED and the driving transistor DT, based on the data signal DATA and the sensing value SEND.

A process of generating the compensation data signal by using the data processor 125 will be described below.

To generate the compensation data signal, the data processor 125 can read initial compensation data stored in the second memory 124 and can store the initial compensation data in the first memory 123. The data processor 125 can compare a current sensing value, transferred from the sensing circuit unit 146, with the initial compensation data (or updated compensation data). The data processor 125 can compare the current sensing value with the initial compensation data, predict a change and a degradation in characteristic of the elements such as the organic light emitting diode OLED and the driving transistor DT, based on a difference therebetween, and generate the compensation data signal for compensating for the predicted change and degradation.

As described above, all of the sensing-less method and the sensing method can use the memories 123 and 124 for compensating for the subpixels included in the display panel. The light emitting display apparatus can perform a calibration operation after the supply of power is performed for increasing driving (communication) stability and reliability between the timing controller 120 and the memories 123 and 124, and this will be described below. Hereinafter, for convenience of description, a calibration operation performed between the timing controller 120 and the first memory 123 will be described for example.

Figure 9:
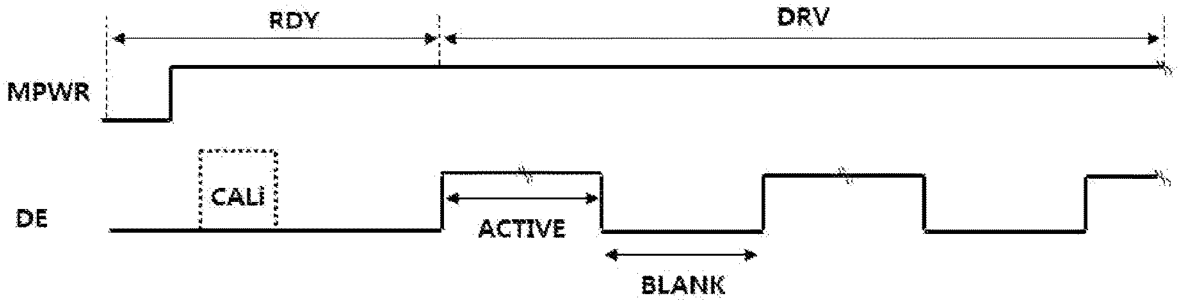
FIGS. 9 to 11 are diagrams for describing a calibration operation between a first memory and a timing controller according to a first embodiment of the present disclosure.
Figure 10:
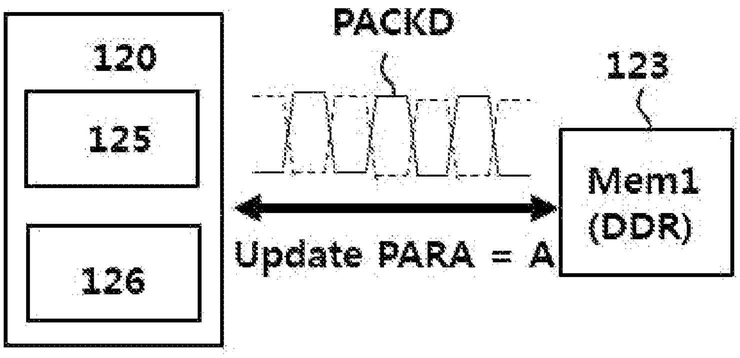
Figure 11:
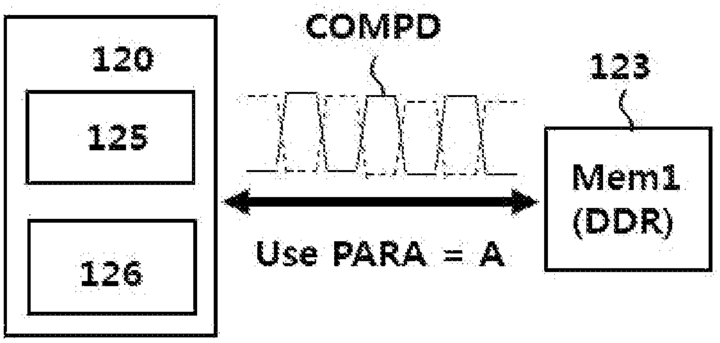

FIGS. 9 to 11 are diagrams for describing a calibration operation between a first memory and a timing controller according to a first embodiment of the present disclosure.

As illustrated in FIGS. 9 to 11, when the supply of power MPWR is performed on a light emitting display apparatus, a driving period DRV can be performed via a preparation period RDY. The light emitting display apparatus can perform a preparation operation for driving of various elements including a timing controller 120 and a first memory 123 during the preparation period RDY.

During the preparation period RDY, the timing controller 120 can perform data transfer/reception for transferring and receiving packet data PACKD to and from the first memory 123 through a connected communication line. Particularly, the timing controller 120 can add calibration data, generated from a calibration circuit unit 126, to the packet data PACKD and can transfer the calibration data to the first memory 123. The timing controller 120 and the first memory 123 can set a parameter value for forming an optimal communication environment, based on the calibration data.

Hereinafter, a calibration operation performed during the preparation period RDY can be defined as an initial calibration operation CALi. Further, a parameter value for forming an optimal communication environment between the timing controller 120 and the first memory 123 on the basis of the initial calibration operation CALi performed during the preparation period RDY can be defined as A. When the parameter value is set based on the initial calibration operation CALi, each of the timing controller 120 and the first memory 123 can be updated (Update PARA=A) from a setting situation thereof to an A parameter.

The light emitting display apparatus can generate a signal (for example, data enable signal DE) needed for driving of various elements including the timing controller 120 and the first memory 123. The data enable signal DE can include a plurality of active periods ACTIVE and a blank period BLANK. The active period ACTIVE and a blank period BLANK can be a period which defines one frame.

The light emitting display apparatus can perform an operation (for example, the supply of a data signal and a scan signal) for displaying an image on a display panel during the active period ACTIVE and can perform an operation (for example, the transfer and reception of compensation data) for compensating for the display panel during the blank period BLANK. The blank period BLANK can be an operation period for compensating for the display panel, and moreover, can be a period which does not display an image on the display panel.

The timing controller 120 can transfer and receive compensation data COMPD during the blank period BLANK, based on communication with the first memory 123. In this case, the timing controller 120 and the first memory 123 can use (Use PARA=A) the A parameter provided based on the initial calibration operation CALi.

A period where the compensation data COMPD is transferred and received can be one of significant processes in the driving period DRV of the light emitting display apparatus. The reason can be because a data signal is compensated for based on the compensation data stored in the first memory 123, and thus, when the compensation data is damaged, an undesired result (luminance non-uniformity or the like) occurs in the display panel due to inaccurate compensation.

Hereinafter, therefore, a calibration method for communication stability and reliability between the timing controller 120 and the first memory 123 will be described. The calibration methods of the present disclosure can be applied to any display apparatus of the present disclosure.

FIGS. 12 to 18 are diagrams for describing a calibration method according to a first embodiment of the present disclosure.

As illustrated in FIGS. 12 to 18, the calibration method according to the first embodiment can additionally perform calibration operations CAL1 and CAL2, based on at least one blank period BLANK. The blank period BLANK can be defined as an idle period where the first memory 123 is idle for a short time. Hereinafter, however, an example will be described where the blank period BLANK is defined as a sensing period, based on a compensation method of a light emitting display apparatus.

A driving period DRV of the light emitting display apparatus can include a first display period DIS1, a first sensing period SEN1, a second display period DIS2, a second sensing period SEN2, and a third display period DIS3. The display periods DIS1 to DIS3 can correspond to an active period ACTIVE, and the sensing periods SEN1 and SEN2 can correspond to a blank period BLANK. In the drawings, for convenience of description, an example is described where the sensing periods SEN1 and SEN2 are provided for each blank period BLANK of each frame, but this can be merely one embodiment and can be referred to.

A first calibration operation CAL1 and a second calibration operation CAL2 can be performed during the first sensing period SEN1 and the second sensing period SEN2. However, the first calibration operation CAL1 and the second calibration operation CAL2 can be performed for a time except use periods AU, BU, CU, and DU, in the first sensing period SEN1 and the second sensing period SEN2.

The use periods AU, BU, CU, and DU for using the first memory 123 can include a read/write period where compensation data is transferred and received or new data is written through communication between the timing controller 120 and the first memory 123.

Figure 12:
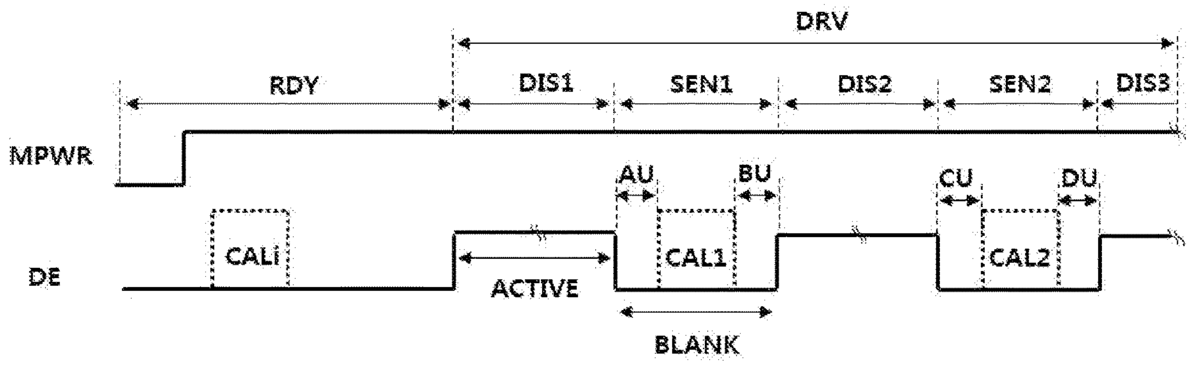
FIGS. 12 to 18 are diagrams for describing a calibration method according to a first embodiment of the present disclosure.

In FIG. 12, an example is illustrated where the use periods AU, BU, CU, and DU for using the first memory 123 include first schedule times AU and CU after a falling edge of the active period ACTIVE occurs and second schedule times BU and DU before a rising edge of the blank period BLANK occurs. Here, the first schedule times AU and CU can be defined as a former use time of the first memory 123, and the second schedule times BU and DU can be defined as a latter use time of the first memory 123.

Hereinafter, a change based on that the first and second calibration operations CAL1 and CAL2 are performed by the calibration method according to the first embodiment on the basis of at least one blank period BLANK will be described.

Figure 13:
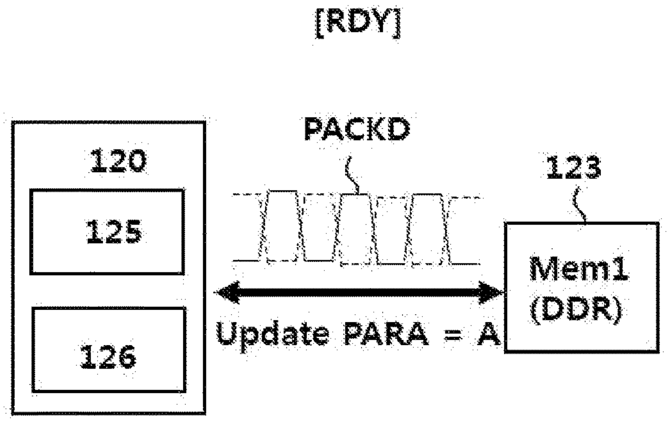

As in FIG. 13, during the preparation period RDY, each of the timing controller 120 and the first memory 123 can be updated (Update PARA=A) from a setting situation thereof to an A parameter, based on the initial calibration operation CALi of transferring and receiving packet data PACKD.

Figure 14:
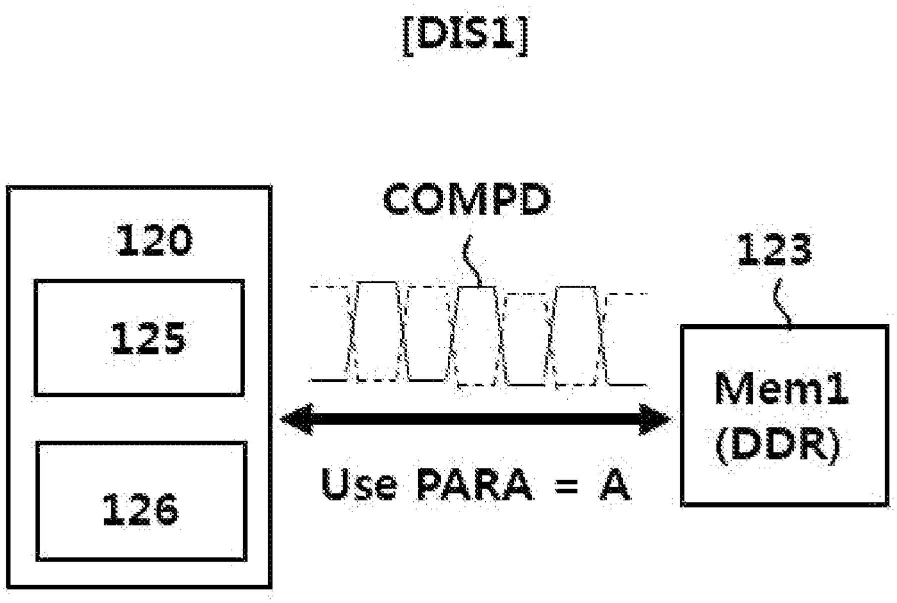

Further, as in FIG. 14, during the first display period DIS1, each of the timing controller 120 and the first memory 123 can use (Use PARA=A) the A parameter provided based on the initial calibration operation CALi and can perform communication for transferring and receiving compensation data COMPD.

Figure 15:
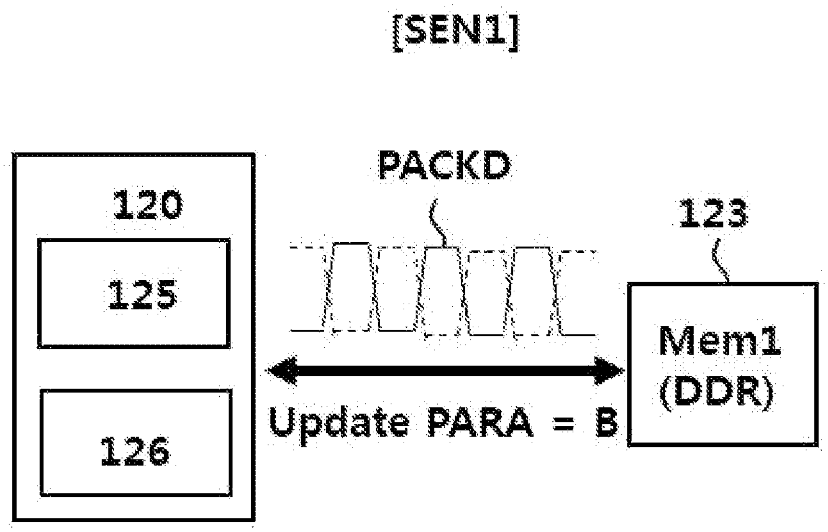

As in FIG. 15, during the first sensing period SEN1, each of the timing controller 120 and the first memory 123 can be updated (Update PARA=B) from a setting situation thereof to a new B parameter, based on a new first calibration operation CAL1 of transferring and receiving the packet data PACKD.

Figure 16:
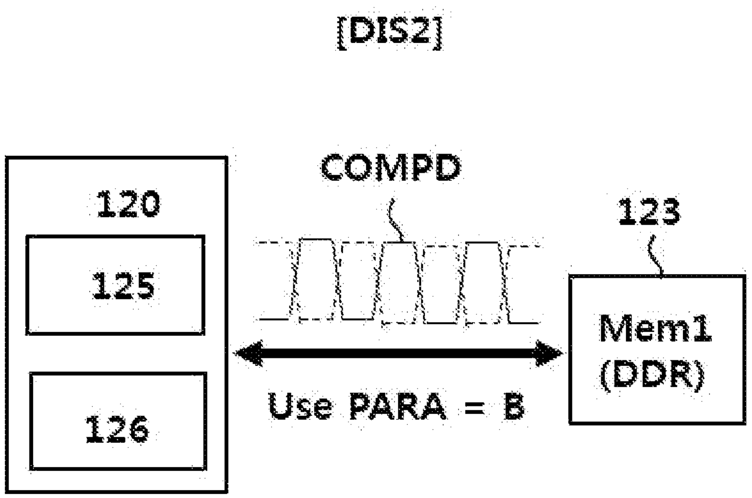

Further, as in FIG. 16, during the second display period DIS2, each of the timing controller 120 and the first memory 123 can use (Use PARA=B) the B parameter newly provided based on the first calibration operation CAL1 and can perform communication for transferring and receiving compensation data COMPD.

Figure 17:
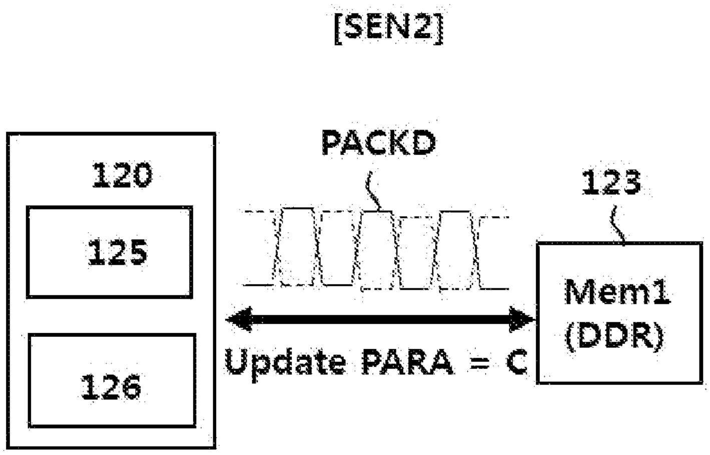

As in FIG. 17, during the second sensing period SEN2, each of the timing controller 120 and the first memory 123 can be updated (Update PARA=C) from a setting situation thereof to a new C parameter, based on a new second calibration operation CAL2 of transferring and receiving the packet data PACKD.

Figure 18:
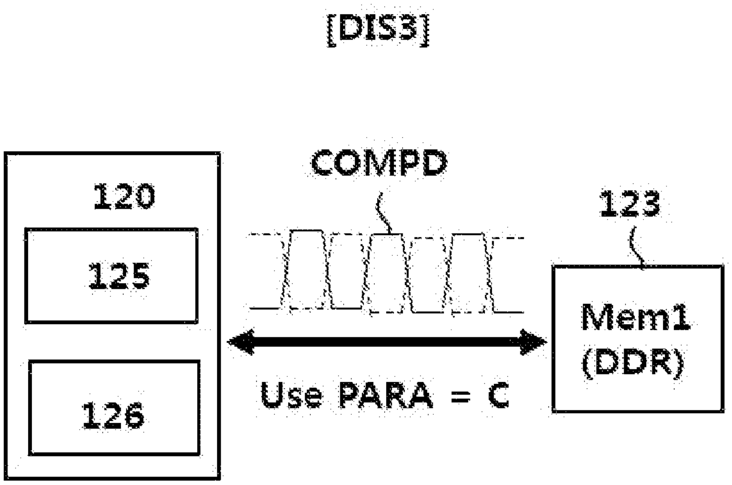

Further, as in FIG. 18, during the third display period DIS3, each of the timing controller 120 and the first memory 123 can use (Use PARA=C) the C parameter newly provided based on the second calibration operation CAL2 and can perform communication for transferring and receiving the compensation data COMPD.

Furthermore, in the first embodiment, for convenience of description, an example is described where the second calibration operation CAL2 is performed after the first calibration operation CAL1 is performed. However, when a certain time elapses or reaches the certain amount of use (the predetermined amount of use) after an operation of a light emitting display apparatus is performed, a calibration operation is regularly performed based thereon, or can be irregularly performed based on an external control signal (interrupt based on an environment variable).

When a calibration operation is regularly or irregularly and additionally performed as in the first embodiment, communication stability and reliability between the timing controller 120 and the first memory 123 can increase, thereby solving a problem or addressing a limitation (e.g., luminance non-uniformity) where compensation data may be damaged (lost) or inaccurate compensation may be performed.

Figure 19:
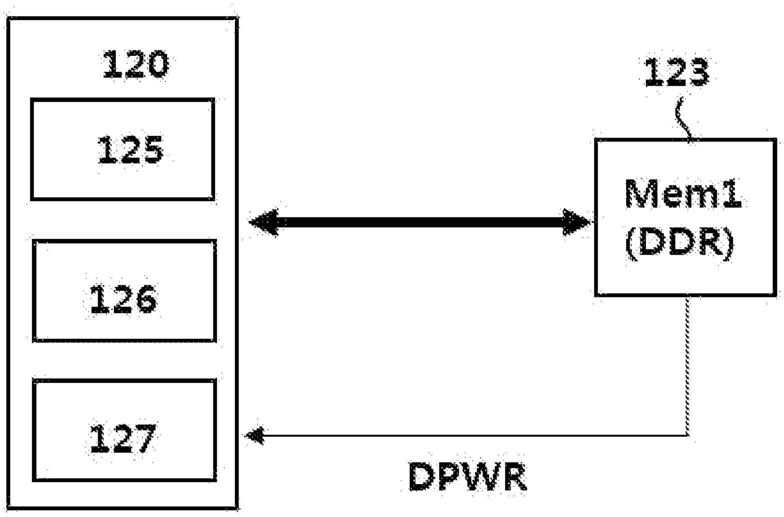
FIGS. 19 and 20 are diagrams for describing some elements of a timing controller included in a light emitting display apparatus according to a second embodiment of the present disclosure.
Figure 20:
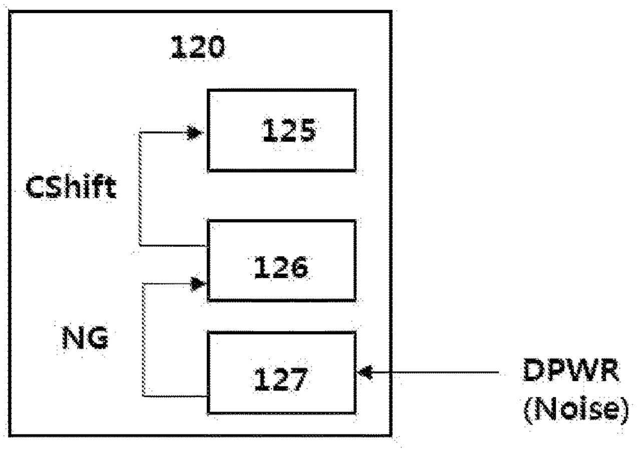

FIGS. 19 and 20 are diagrams for describing some elements of a timing controller included in a light emitting display apparatus according to a second embodiment of the present disclosure, and FIGS. 21 to 26 are diagrams for describing a calibration method according to a second embodiment of the present disclosure. Again, all the calibration methods according to the present disclosure can be applied to any display apparatus of the present disclosure or any other suitable display apparatus.

As illustrated in FIG. 19, a timing controller 120 according to the second embodiment can include a memory power monitor 127 which monitors a memory power DPWR applied to a first memory 123 of the display apparatus.

As illustrated in FIG. 20, the memory power monitor 127 can monitor the memory power DPWR and can detect the occurrence or not of noise. When noise occurs in the memory power DPWR, the memory power monitor 127 can generate a noise sensing signal NG and can transfer the noise sensing signal NG to a calibration circuit unit 126.

The calibration circuit unit 126 can enhance communication stability and reliability in performing communication between the timing controller 120 and a memory and can perform an operation of adjusting (changing) an operating condition, based on an environment change (a temperature change or the like). The calibration circuit unit 126 can analyze the noise sensing signal NG to generate a movement signal CShift for adjusting a time at which a calibration operation is performed. The calibration circuit unit 126 can analyze the noise sensing signal NG to generate a signal for adjusting a time at which a calibration operation is performed and a period where the calibration operation is performed.

A data processor 125 can generate packet data including a signal for adjusting a time at which a calibration operation is performed, based on the movement signal CShift transferred from the calibration circuit unit 126.

Figure 21:
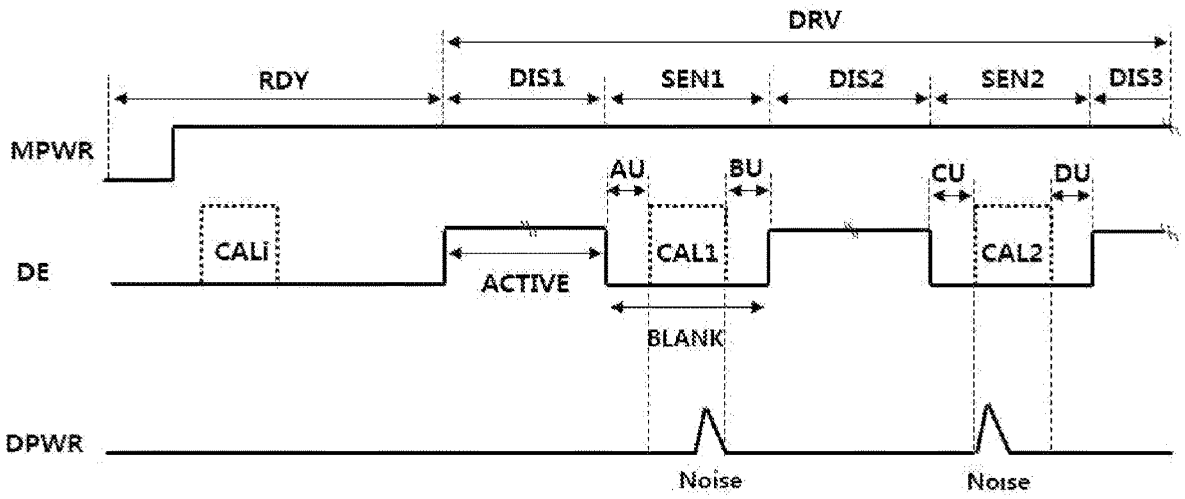
FIGS. 21 to 26 are diagrams for describing a calibration method according to a second embodiment of the present disclosure.

As illustrated in FIG. 21, two examples can be described where a cause of the noise occurrence of the memory power DPWR is predictable and unpredictable. In predictable noise, an example can be described where a current or a voltage based on driving of a specific device increases, and thus, a main power is shaken. In unpredictable noise, an example can be described where electromagnetic interference (EMI) occurs regardless of driving of a device and a sudden error of an internal device may occur (e.g., interrupt caused by an environment variable such as an overcurrent).

Hereinafter, a second embodiment will be described under a condition where noise of the memory power DPWR occurring in the first sensing period SEN1 is defined as predictable noise and noise of the memory power DPWR occurring in the second sensing period SEN2 is defined as unpredictable noise.

Figure 22:
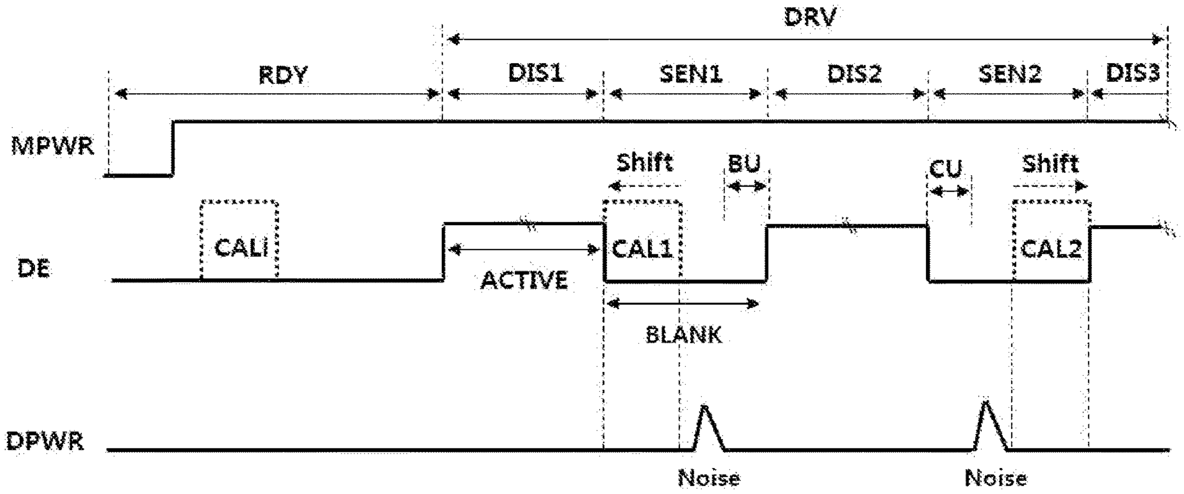
Figure 23:
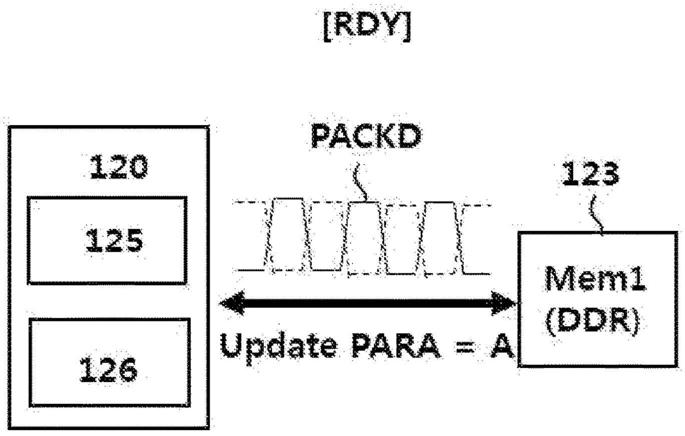
Figure 24:
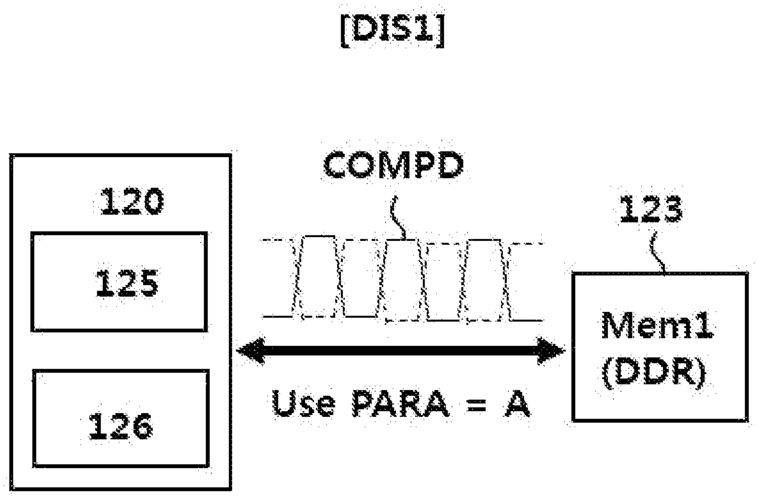
Figure 25:
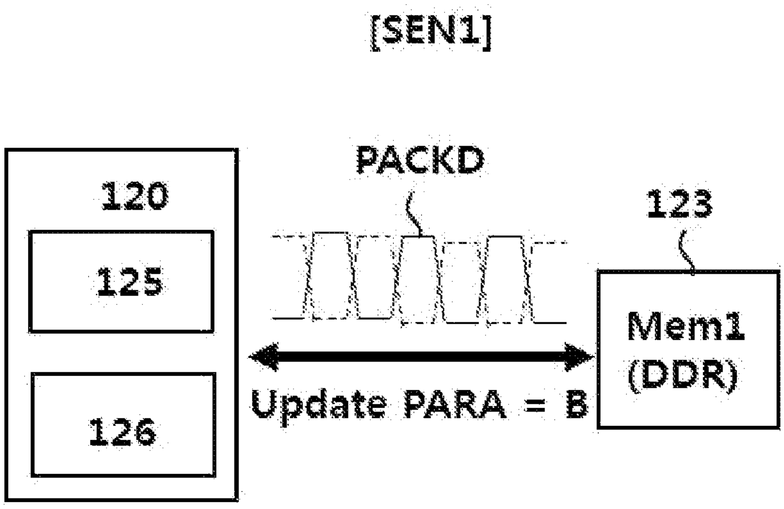
Figure 26:
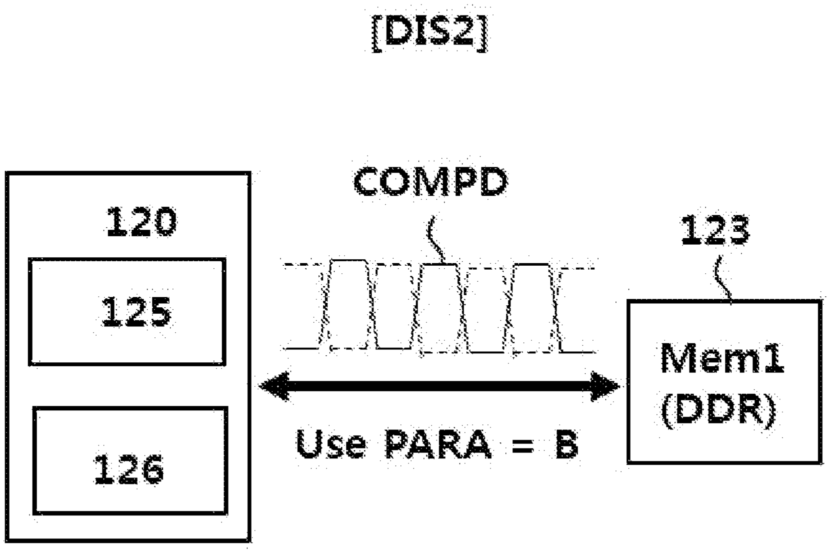

As illustrated in FIGS. 20 to 22, the second embodiment can shift a first calibration operation CAL1 time and a second calibration operation CAL2 time by using a memory power monitor 127, a calibration circuit unit 126, and a data processor 125, based on noise occurring in a memory power DPWR.

As in a first sensing period SEN1 of FIG. 21, in a case where it is predicted that noise of the memory power DPWR occurs in a latter portion of the first calibration operation CAL1, the timing controller 120 can previously sense (predict and sense) the occurrence of noise and can shift the first calibration operation CAL1 time to a former use time (corresponding to AU) of the first memory 123 as in FIG. 22. Furthermore, as in the first sensing period SEN1 of FIG. 21, in a case where predictable noise occurs, the timing controller 120 can shift the first calibration operation CAL1 time to a latter use time of the first memory 123.

As in a second sensing period SEN2 of FIG. 21, in a case where it is predicted that noise of the memory power DPWR occurs in a former portion of the second calibration operation CAL2, the timing controller 120 can directly sense (predict and sense) the occurrence of noise and can shift the second calibration operation CAL2 time to a latter use time (corresponding to DU) of the first memory 123 as in FIG. 22. Furthermore, as in the second sensing period SEN2 of FIG. 21, in a case where unpredictable noise occurs, the timing controller 120 can shift the second calibration operation CAL2 time to one use time selected from among the former user time and the latter use time of the first memory 123.

As in FIGS. 23 to 26, by using the method according to the first embodiment or the second embodiment, a parameter setting situation can be updated during a preparation period RDY, a first display period DIS1, a first sensing period SEN1, and a second display period DIS2, and an updated parameter can be used.

On the other hand, as in FIG. 22, when noise occurs in the memory power DPWR, a changed calibration operation period can penetrate into a use time (an operation region) of the first memory 123, and thus, it can be preferable that this is considered.

According to the second embodiment, when a calibration operation time is shifted to a new time instead of a previously set time, the timing controller 120 can temporarily skip an update operation for writing new compensation data in the first memory 123 and can perform a sensing period (of a power-stabilized period) of at least next frame. In this case, the update operation can be performed in a stable power application state, and thus, a limitation can be solved or addressed where compensation data can be damaged (lost) or inaccurate compensation can be performed based thereon, thereby increasing driving stability and reliability.

Figure 27:
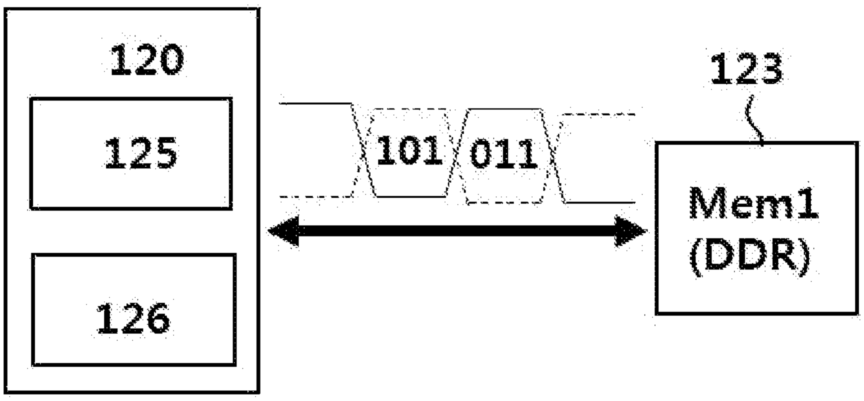
FIG. 27 is a diagram illustrating a data pattern capable of being obtained between a timing controller and a first memory in performing a calibration operation according to an embodiment of the present disclosure.

FIG. 27 is a diagram illustrating a data pattern capable of being obtained between a timing controller and a first memory in performing a calibration operation according to an embodiment of the present disclosure.

As illustrated in FIG. 27, the calibration operation according to an embodiment of the present disclosure can perform a read/write operation of transferring and receiving data between a timing controller 120 and a first memory 123 of a display apparatus. Therefore, when a physical signal waveform transferred and received through a communication line between the timing controller 120 and the first memory 123 is detected during a period where the calibration operation is performed, a data pattern (for example, 101 and 011) repeated at every certain period can be seen.

One or more embodiments of the present disclosure can perform a calibration operation during an idle period of a memory or a sensing period of a display apparatus in performing high speed communication between a timing controller and the memory, thereby increasing driving stability and reliability. Further, one or more embodiments of the present disclosure can perform the calibration operation by avoiding noise occurring in a memory power, and thus, can minimize an error occurrence rate. Further, one or more embodiments of the present disclosure can perform an update operation for writing new compensation data in a stable power application state, and thus, can solve a problem or address a limitation (e.g., luminance non-uniformity) where compensation data can be damaged (lost) or inaccurate compensation can be performed based thereon.

The effects according to the present disclosure are not limited to the above examples, and other various effects can be included in the specification.

While the present disclosure has been particularly shown and described with reference to exemplary embodiments thereof, it will be understood by those of ordinary skill in the art that various changes in form and details can be made therein without departing from the spirit and scope of the present disclosure as defined by the following claims.

What is claimed is:

1. A display apparatus comprising:
a display panel configured to display an image;
a driver configured to drive the display panel;
a controller configured to control the driver; and
a memory controlled by the controller,
wherein the controller performs a calibration operation during an idle period of the memory, and
wherein the idle period of the memory is included in a sensing period of the display panel.

2. The display apparatus of claim 1, wherein the controller changes a parameter value for forming a communication environment with the memory, based on the calibration operation.

3. The display apparatus of claim 1, wherein the controller monitors a memory power applied to the memory and senses occurrence or no occurrence of noise in the memory power.

4. The display apparatus of claim 3, wherein, when noise occurs in the memory power, the controller changes a time at which the calibration operation is performed.

5. The display apparatus of claim 4, wherein the time, at which the calibration operation is performed, is shifted to a former use time or a latter use time of the memory in the sensing period of the display panel.

6. The display apparatus of claim 4, wherein, when the time at which the calibration operation is performed is shifted, the controller temporarily skips an update operation of writing new data in the memory.

7. The display apparatus of claim 6, wherein the controller performs the update operation of writing the new data in the memory in a sensing period of at least next frame.

8. The display apparatus of claim 1, wherein the sensing period includes a first sensing period and a second sensing period after the first sensing period, each of the first sensing period and the second sensing period including a former use time of the memory, a latter use time of the memory and a calibration time between the former use time and the latter use time.

9. The display apparatus of claim 8, wherein the controller performs a first calibration operation during the calibration time of the first sensing period, and performs a second calibration operation during the calibration time of the second sensing period.

10. The display apparatus of claim 9, wherein based on the first calibration operation, a communication environment formed between the controller and the memory is updated as a first parameter value.

11. The display apparatus of claim 10, wherein based on the second calibration operation, the communication environment formed between the controller and the memory is updated as a second parameter value.

12. A driving method of a display apparatus including a display panel configured to display an image, a driver configured to drive the display panel, a controller configured to control the driver, and a memory controlled by the controller, the driving method comprising:
driving the display panel; and
performing a calibration operation of changing a parameter value for forming a communication environment with the memory during a sensing period for compensating for the display panel,
wherein the performing of the calibration operation comprises:
monitoring a memory power applied to the memory, and when noise occurs in the memory power, changing a time at which the calibration operation is performed.

13. The driving method of claim 12, wherein the time, at which the calibration operation is performed, is shifted to a former use time or a latter use time of the memory in the sensing period of the display panel.

14. The driving method of claim 12, further comprising, when the time at which the calibration operation is performed is shifted, temporarily skipping an update operation of writing new data in the memory.

15. The driving method of claim 14, wherein the update operation of writing the new data in the memory is performed in a sensing period of at least next frame.

* * * * *